(12) United States Patent
Romanowich et al.

(10) Patent No.: US 9,062,893 B2
(45) Date of Patent: Jun. 23, 2015

(54) SPEED ADJUSTMENT OF AN ACTUATOR FOR AN HVAC SYSTEM

(75) Inventors: Gary A. Romanowich, Slinger, WI (US); Kevin A. Weiss, Gurnee, IL (US); Jeff S. Flannery, Dousman, WI (US); Russell W. Diamond, New Berlin, WI (US); Robert K. Alexander, Menomonee Falls, WI (US)

(73) Assignee: JOHNSON CONTROLS TECHNOLOGY COMPANY, Holland, MI (US)

( * ) Notice: Subject to any disclaimer, the term of this patent is extended or adjusted under 35 U.S.C. 154(b) by 317 days.

(21) Appl. No.: 13/107,793

(22) Filed: May 13, 2011

(65) Prior Publication Data
US 2012/0290136 A1    Nov. 15, 2012

(51) Int. Cl.
*G05B 13/00* (2006.01)
*F24F 13/14* (2006.01)
*F24F 11/04* (2006.01)

(52) U.S. Cl.
CPC ............. *F24F 13/1426* (2013.01); *F24F 11/04* (2013.01); *F24F 2013/1433* (2013.01)

(58) Field of Classification Search
None
See application file for complete search history.

(56) References Cited

U.S. PATENT DOCUMENTS

| | | | |
|---|---|---|---|
| 4,844,335 A * | 7/1989 | McKinley et al. | 237/8 R |
| 5,272,427 A * | 12/1993 | Nold et al. | 318/672 |
| 6,827,100 B1 | 12/2004 | Carlson | |
| 7,051,994 B2 | 5/2006 | Carlson | |
| 7,185,504 B2 * | 3/2007 | Kasai et al. | 62/186 |
| 7,607,637 B2 | 10/2009 | Furrer | |
| 7,798,170 B2 | 9/2010 | Hotz et al. | |
| 7,865,338 B2 | 1/2011 | Balemi et al. | |
| 7,912,562 B2 * | 3/2011 | Dute et al. | 700/51 |
| 7,931,525 B2 | 4/2011 | Lehnert | |
| 2004/0211200 A1 * | 10/2004 | McMillan et al. | 62/186 |
| 2004/0244960 A1 * | 12/2004 | Errington et al. | 165/201 |
| 2005/0278071 A1 * | 12/2005 | Durham, III | 700/276 |
| 2006/0117769 A1 * | 6/2006 | Helt et al. | 62/161 |
| 2006/0279240 A1 * | 12/2006 | Lendi | 318/268 |
| 2007/0095082 A1 * | 5/2007 | Garrett et al. | 62/180 |
| 2007/0170385 A1 | 7/2007 | Furrer | |
| 2007/0295125 A1 | 12/2007 | Marthaler et al. | |
| 2008/0051024 A1 * | 2/2008 | Caliendo et al. | 454/369 |
| 2008/0173838 A1 | 7/2008 | Schmidig et al. | |
| 2009/0126901 A1 * | 5/2009 | Hegar et al. | 165/41 |
| 2009/0301238 A1 | 12/2009 | Wintsch et al. | |
| 2010/0007301 A1 | 1/2010 | Ochsenbein et al. | |
| 2010/0253270 A1 | 10/2010 | Kuster et al. | |

OTHER PUBLICATIONS

Belimo, Adaption and Synchronisation, Jul. 28, 1999, 2 pages.
Belimo, Laufzeit Running time nominal, Oct. 5, 1999, 4 pages.
Belimo, Laufziet nominal, Oct. 5, 1999, 3 pages.
Johnson Controls, M9106-xGx-2 Series Electric Non-spring Return Actuators, Installation Instructions, Aug. 31, 2001, 7 pages.

* cited by examiner

*Primary Examiner* — Sean Shechtman
(74) *Attorney, Agent, or Firm* — Foley & Lardner LLP

(57) ABSTRACT

An actuator for moving a component of an HVAC system includes a housing, a motor, and a hub configured to receive a shaft. The actuator also includes a processing circuit configured to temporarily shift the actuator from a first speed mode to a second speed mode that is different than the first speed mode upon receiving an input signal.

20 Claims, 9 Drawing Sheets

SPEED ADJUSTMENT OF AN ACTUATOR FOR AN HVAC SYSTEM

BACKGROUND

The present disclosure relates generally to the field of actuators. The present disclosure more particularly relates to systems and methods for adjusting the speed of an actuator for effecting movement of a component within a heating, ventilation, and air conditioning (HVAC) system.

In building control systems, it is desirable to have actuators with constant running time independent of load. Constant running time enhances the performance of many building control systems. Additionally, operating the electric actuators at slow speeds reduces electric power consumption and therefore conserves energy. Additional benefits may be found in the reduction of audible noise levels generated by slower moving mechanical systems. However, slow actuation speeds are not desirable in manufacturing test processes, control calibration processes, and some building control system applications.

SUMMARY

One embodiment of the invention relates to an actuator for moving a component of an HVAC system. The actuator includes a housing, a motor, and a hub configured to receive a shaft. The actuator also includes a processing circuit configured to temporarily shift the actuator from a first speed mode to a second speed mode that is different than the first speed mode upon receiving an input signal.

Another embodiment of the invention relates to a method for temporarily changing the speed of an actuator for an HVAC system. The method includes providing a processing circuit and detecting with the processing circuit an input signal. The method also includes changing the speed of the actuator from a first speed mode to a second speed mode based on the input signal. The second speed mode has a different speed than the first speed mode.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Referring generally to the Figures, systems and methods are shown for adjusting the speed of an actuator for moving a component within a heating, ventilation, and air conditioning (HVAC) system. The systems and methods utilize an input to a processing circuit of an actuator to adjust the speed of operation of the actuator.

Figure 1:
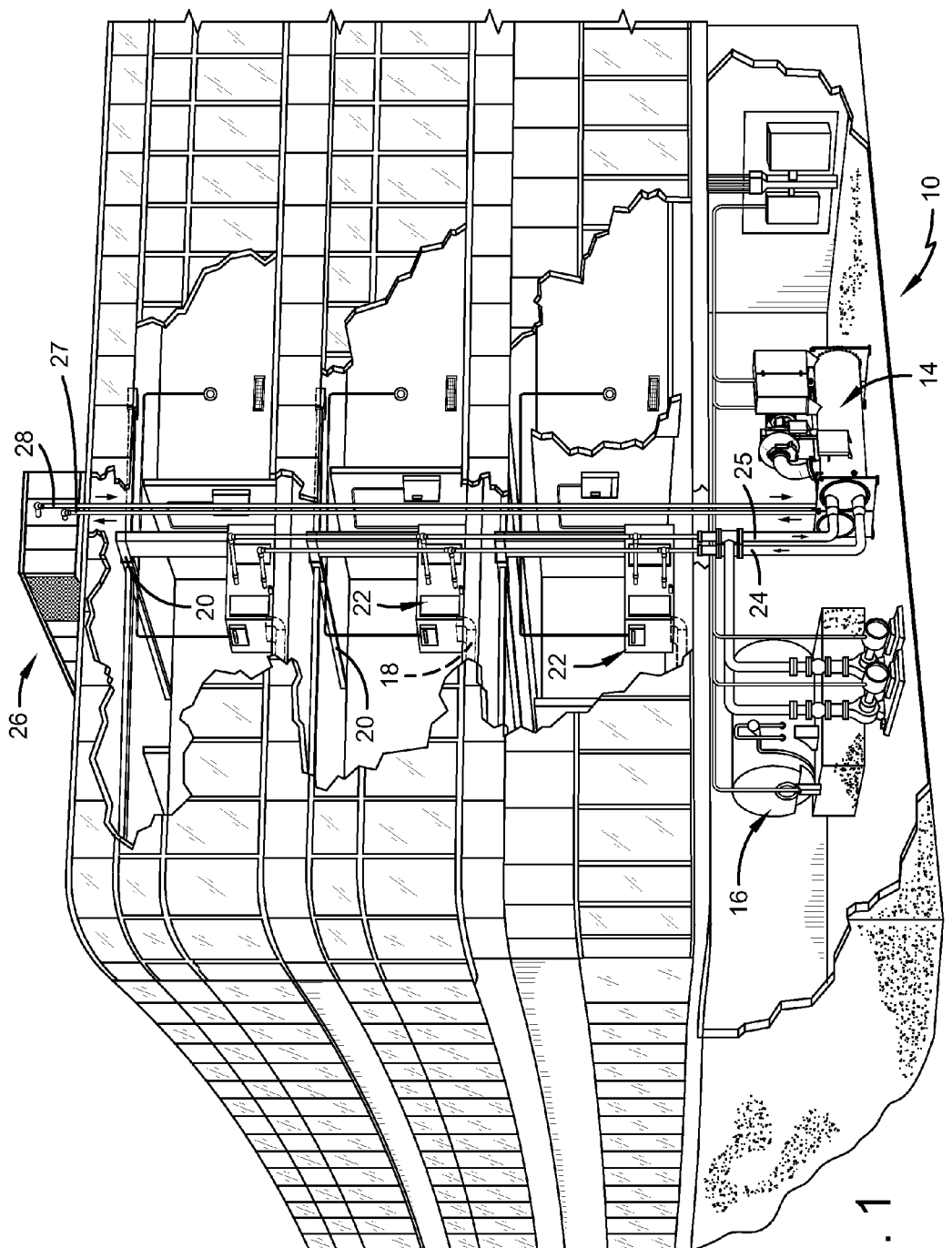
FIG. 1 is a perspective view of a building with a heating, ventilation, and air conditioning (HVAC) system, according to an exemplary embodiment.

Referring to FIG. 1, a perspective view of a building 10 is shown. The illustration of building 10 includes a cutaway view of an exemplary heating, ventilation, and air conditioning system (HVAC) system. The HVAC system shown in FIG. 1 uses a chilled fluid to remove heat from building 10. The chilled fluid is placed in a heat exchange relationship with the cooling load from the building, usually warm air, via a plurality of air handling units 22. During the heat exchange with the cooling load in air handling units 22, the chilled fluid receives heat from the load (i.e., warm air) and increases in temperature, removing heat from the load (e.g., air passed over piping in fan coil units, air handling units, or other air conditioning terminal units through which the chilled fluid flows). The resulting cooled air is provided from air handling units 22 to building 10 via an air distribution system including air supply ducts 20 and air return ducts 18. The HVAC system shown in FIG. 1 includes a separate air handling unit 22 on each floor of building 10, but components such as air handling unit 22 or ducts 20 may be shared between or among multiple floors. Boiler 16 can add heat to the air passing through air handling units 22 when conditions exist to warrant heating.

The chilled fluid is no longer chilled after receiving heat from the load in air handling units 22. To re-chill the fluid for recirculation back to the air-handling units, the fluid is returned to a chiller 14 via piping 25. Within chiller 14, the fluid is placed in a heat exchange relationship with another cooling fluid, usually a refrigerant, in the chiller's heat exchanger (e.g., an evaporator). The refrigerant in the chiller's evaporator removes heat from the chilled fluid during the evaporation process, thereby cooling the chilled fluid. The chilled fluid is then circulated back to the air handling units 22 via piping 24 for subsequent heat exchange with the load, and the cycle repeats.

The refrigerant in chiller 14 that absorbs heat from the chilled fluid changes from a boiling liquid and vapor state to vapor in the evaporator. The vapor is sucked or flows into a compressor of chiller 14 where the compressor's rotating impeller (or another compressor mechanism such as a screw compressor, scroll compressor, reciprocating compressor, centrifugal compressor, etc.) increases the pressure and temperature of the refrigerant vapor and discharges it into the condenser. The condensed refrigerant drains from the condenser into a return line where a variable orifice (e.g., variable expansion valve) meters the flow of liquid refrigerant to the evaporator to complete the refrigerant circuit.

In the embodiment of FIG. 1, water (or another chilled fluid) flows through tubes in the condenser of chiller 14 to absorb heat from the refrigerant vapor and causes the refrigerant to condense. The water flowing through tubes in the condenser is pumped from chiller 14 to a cooling tower 26 via piping 27. Cooling tower 26 utilizes fan driven cooling of the water or fan driven evaporation of the water to remove heat from the water delivered to cooling tower 26 via piping 27. The water cooled by cooling tower 26 is provided back to chiller 14's condenser via piping 28.

Figure 2:
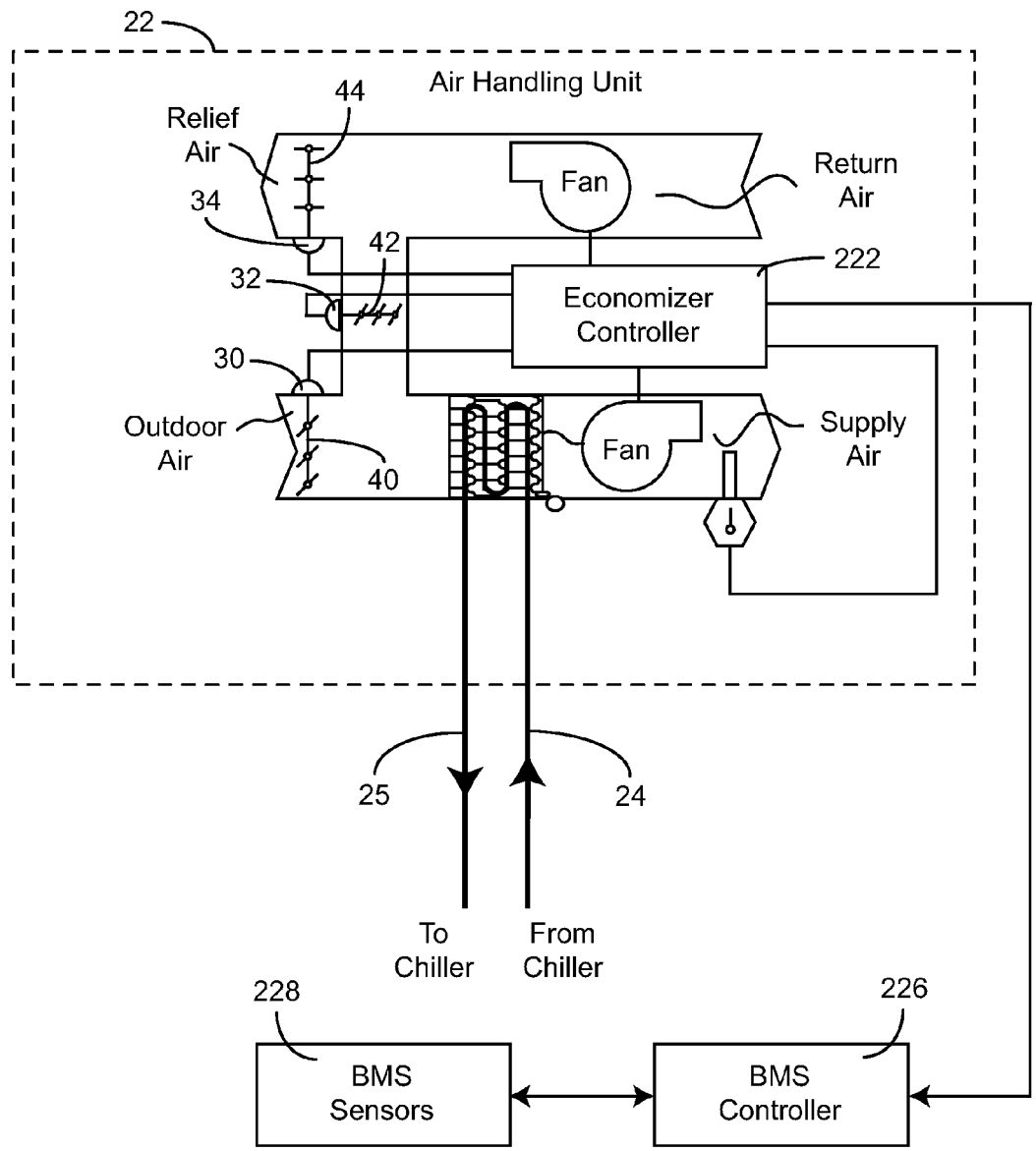
FIG. 2 is a block diagram of a portion of the HVAC system of FIG. 1, according to an exemplary embodiment.

Referring now to FIG. 2, a block diagram of a portion of the HVAC system of FIG. 1 is shown according to an exemplary embodiment. In the diagram of FIG. 2, chilled fluid is supplied via piping 24 to an air handling unit 22 that is an economizer type air handling unit. Economizer type air handling units vary the amount of outdoor air and return air used by the air handling unit for cooling. Air handling unit 22 is shown to include economizer controller 222 that utilizes one or more algorithms (e.g., state based algorithms, extremum seeking control algorithms, etc.) to control the actuators and dampers or fans of air handling unit 22. According to an exemplary embodiment, a single actuator is associated with each damper (such as, e.g., actuators 30, 32, 34 and dampers 40, 42, 44). Economizer controller 222 can be supervised by one or more building management system (BMS) controllers 226. According to another exemplary embodiment, the air handling unit may not be an economizer type air handling unit.

A BMS controller is, in general, a computer-based system configured to control, monitor, and manage equipment in or around a building or building area. A BMS controller may include a METASYS building controller or other devices sold by Johnson Controls, Inc. The BMS controller may provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its sub-systems, and devices.

For example, BMS controller 226 may provide a web-based graphical user interface that allows a user to set a desired setpoint temperature for a building space. BMS controller 226 can use BMS sensors 228 (connected to BMS controller 226 via a wired or wireless BMS or IT network) to determine if the setpoint temperatures for the building space are being achieved. BMS controller 226 can use such determinations to provide commands to economizer controller 222 or other components of the building's HVAC system.

In an exemplary embodiment, economizer controller 222 does not receive control commands from BMS controller 226 or does not base its output calculations on an input from BMS controller 226. In other exemplary embodiments, economizer controller 222 receives information (e.g., commands, setpoints, operating boundaries, etc.) from BMS controller 226. For example, BMS controller 226 may provide economizer controller 222 with a high fan speed limit and a low fan speed limit. A low limit may avoid frequent component and power taxing fan start-ups while a high limit may avoid operation near the mechanical or thermal limits of the fan system.

While economizer controller 222 is shown as separate from BMS controller 226, economizer controller 222 may be integrated with BMS controller 226. For example, economizer controller 222 may be a software module configured for execution by a processor of BMS controller 226.

Figure 3:
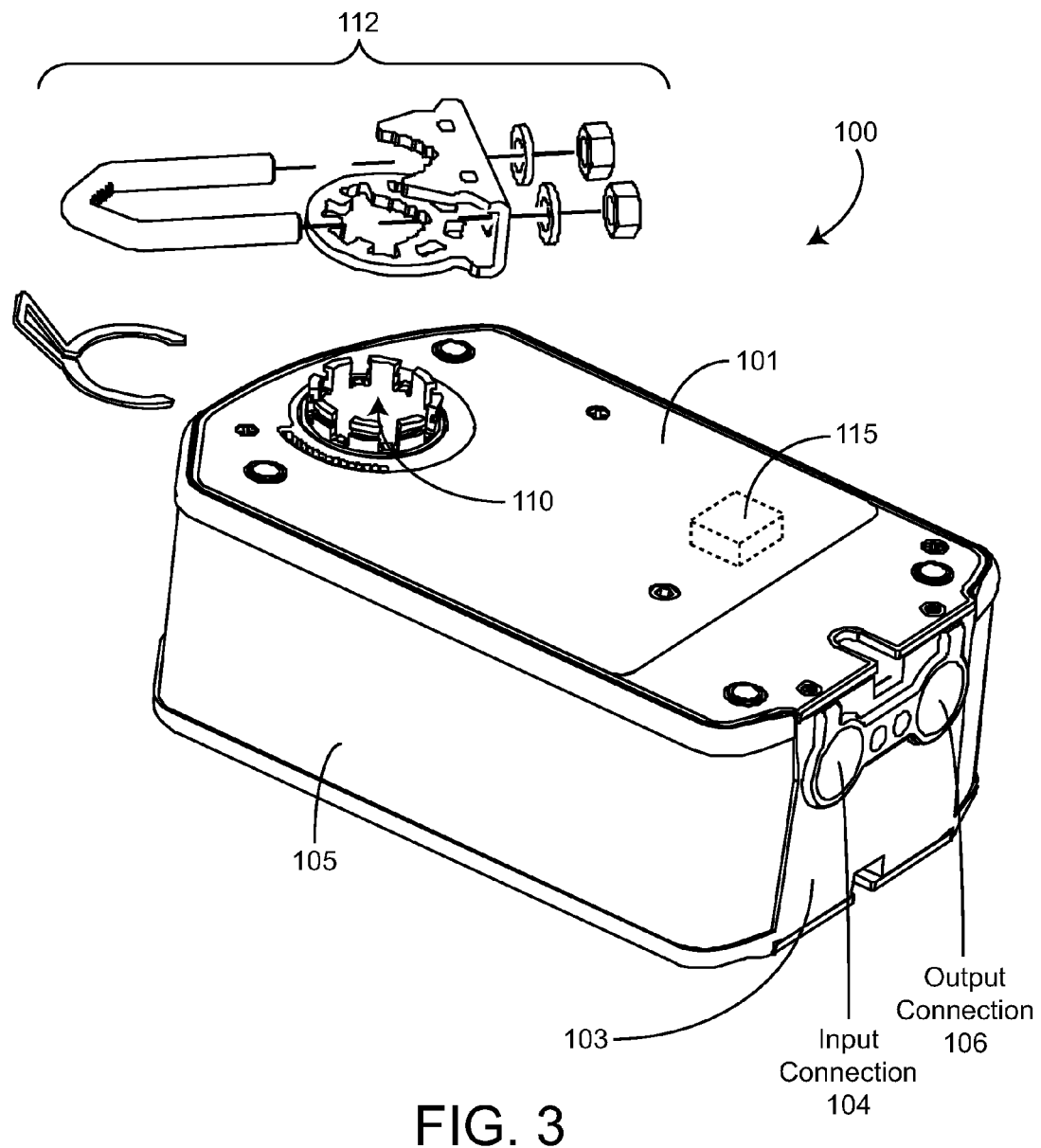
FIG. 3 is a perspective view of an actuator for an HVAC system, according to an exemplary embodiment.
Figure 4:
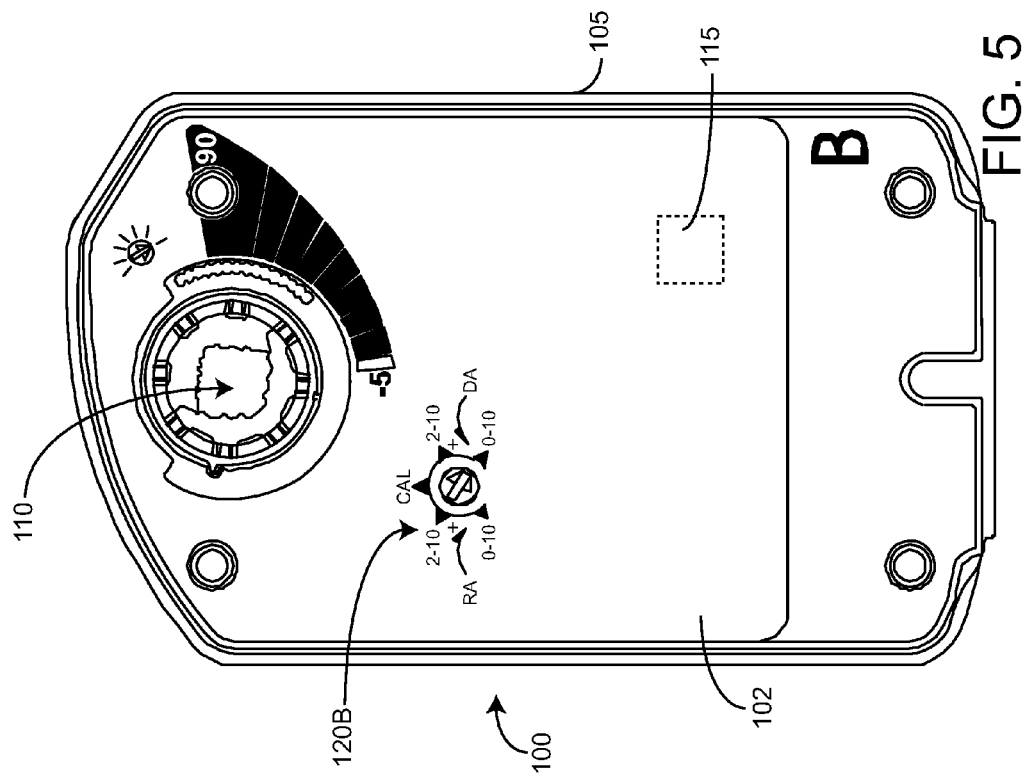
FIG. 4 is a front view of the actuator of FIG. 3, according to an exemplary embodiment.
Figure 5:
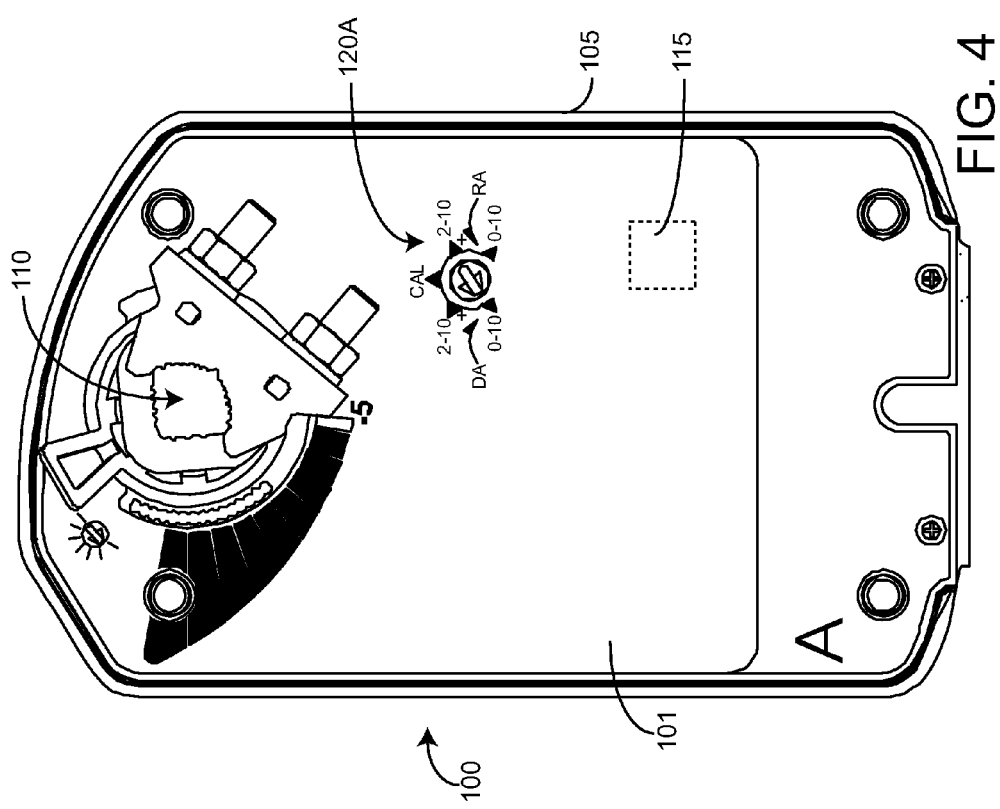
FIG. 5 is a rear view of the actuator of FIG. 3, according to an exemplary embodiment.

Referring now to FIGS. 3-5, an actuator 100 for use in an HVAC system (such as, e.g., HVAC system shown in FIGS. 1-2) is shown according to an exemplary embodiment. Actuator 100 includes a housing 105 having a first or front side 101 (e.g., side A) and second or rear side 102 (e.g., side B) that is opposite the first side 101. Housing 105 of actuator 100 also includes a bottom 103 having an input connection 104 and an output connection 106.

According to an exemplary embodiment, actuator 100 includes a drive device, mechanism, or hub 110 that is configured to drive or effectuate movement of a component of an HVAC system. For example, drive device 110 may be configured to receive a shaft of a damper (such as, e.g., dampers 40, 42, or 44 shown in FIG. 2) in order to drive (e.g., rotationally drive) the shaft. According to the exemplary embodiment shown in FIG. 3, actuator 100 includes a coupling device 112 configured to aid in coupling drive device 110 to a shaft of a damper.

Figure 6:
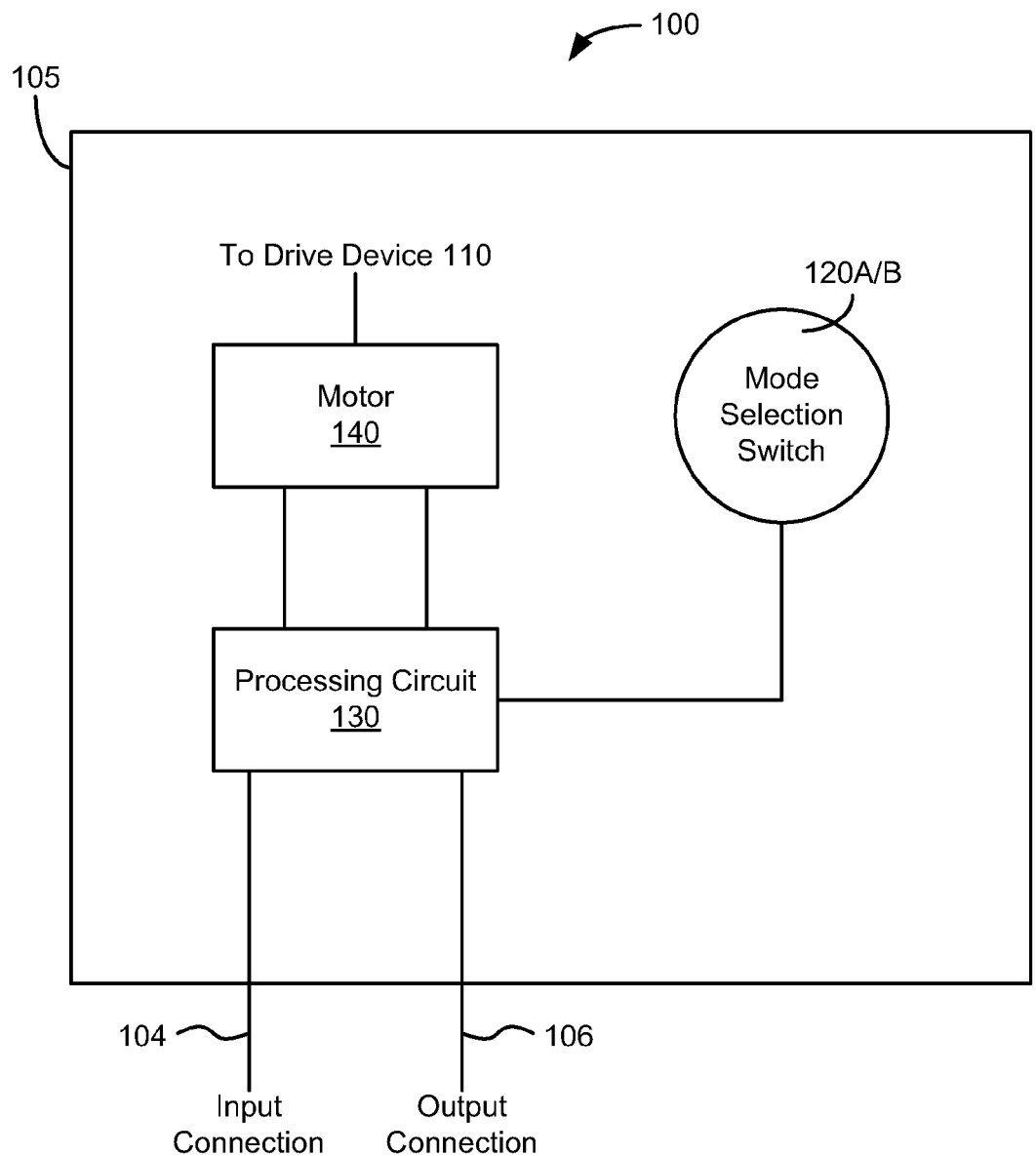
FIG. 6 is a block diagram of the actuator of FIG. 3, according to an exemplary embodiment.

Referring now to FIG. 6, a block diagram of actuator 100 is shown according to an exemplary embodiment. Actuator 100 includes a processing circuit 130. Processing circuit 130 may include a microprocessor (not shown) configured to perform calculations or routines based on certain inputs.

Actuator 100 also includes a motor 140 (e.g., an electric motor) electrically coupled to the processing circuit 130. Motor 140 is coupled to drive device 110 (e.g., to drive a damper or other component).

Actuator 100 also includes input connection 104 and output connection 106, which are electrically connected to processing circuit 130. An input signal is provided to processing circuit 130 via input connection 104 to control the operation of actuator 100. An output signal from processing circuit 130 is provided via output connection 106. For example, the output signal may be provided to a field controller (such as, e.g., to economizer controller 222 shown in FIG. 2) or to a building management system controller (such as, e.g., to BMS controller 226 shown in FIG. 2) to relate the relative rotational position of actuator 100.

Actuator 100 also includes a switch shown as a mode selection switch 120A/B. For example, first side 101 includes a mode selection switch 120A (as shown in FIG. 4) and second side 102 includes a mode selection switch 120B (as shown in FIG. 5). For sake of clarity, the mode selection switch will be referred to as mode selection switch 120 for the remainder of this document.

Figure 7:
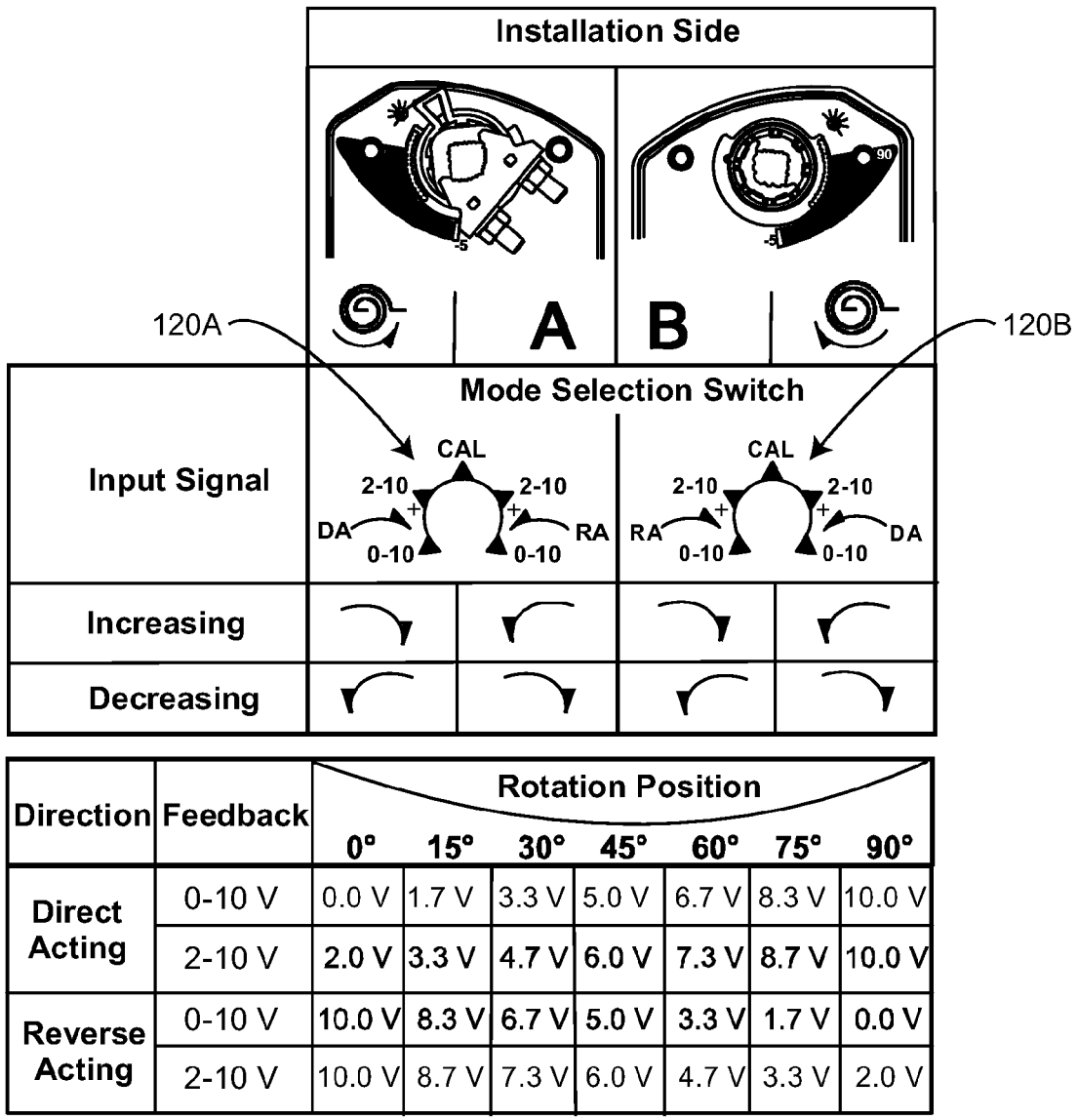
FIG. 7 is a detailed diagram of the mode selection switch of the actuator of FIG. 3, according to an exemplary embodiment.

According to an exemplary embodiment, mode selection switch 120 has a distinct number of modes or positions. For example, mode selection switch 120 (as shown in FIG. 7) includes a 0-10 direct acting (DA) mode, a 2-10 DA mode, a calibration (CAL) mode, a 2-10 reverse acting (RA) mode, and a 0-10 RA mode. According to other exemplary embodiments, mode selection switch 120 may have a greater or smaller number of modes and/or may have modes other than listed as above.

According to one exemplary embodiment, mode selection switch 120 is a potentiometer. However, according to other exemplary embodiments, mode selection switch 120 may be a different type of switch (e.g., a push button switch shown as switch 115 in FIGS. 3-5).

According to an exemplary embodiment, the position of drive device 110 is controlled by an input voltage (e.g., a voltage input signal) to processing circuit 130. For example, as shown in FIG. 7, when the mode selection switch is set to 0-10 DA, an input voltage of 0.0 VDC corresponds to 0 degrees of rotation position. For this same mode, an input voltage of 1.7 VDC corresponds to 15 degrees of rotation position, 3.3 VDC corresponds to 30 degrees of rotation position, 5.0 VDC corresponds to 45 degrees of rotation position, 6.7 VDC corresponds to 60 degrees of rotation position, 8.3 VDC corresponds to 75 degrees of rotation position, and 10.0 VDC corresponds to 90 degrees of rotation position. As such, actuator 100 is a linear proportional actuator. However, according to another exemplary embodiment, actuator 100 may be a non-linear actuator.

FIG. 7 also shows the various rotational positions for the input voltages of the other modes of mode selection switch 120, according to one exemplary embodiment. However, according to other exemplary embodiments, the individual modes may have different input voltage ranges, or may have a different type of input signal (e.g., the input signal may be AC voltage, or a current).

According to an exemplary embodiment, motor 140 of actuator 100 typically operates at a first or normal speed (e.g., a first speed mode) for the various modes of mode selection switch 120. However, according to another exemplary embodiment, motor 140 operates at a second or faster speed (e.g., a second speed mode) when processing circuit 130 receives a predetermined input signal.

According to one exemplary embodiment, moving or placing mode selection switch 120 into the CAL mode sends an input signal to processing circuit 130 to operate motor 140 in the second speed mode. For example, by having mode selection switch 120 in the CAL mode, processing circuit 130 may apply a higher power to motor 140 (e.g., a higher voltage or a higher current) to operate motor 140 in the second (faster) speed mode.

According to this exemplary embodiment, actuator 100 may go through a predetermined sequence of functions or positions when the CAL mode is selected. For example, drive device 110 may go to a 0 degree position and then to a full open (e.g., 90 degree) position once the CAL mode is selected, and then back to the normal operating position. As such, the calibration of the actuator is accomplished at a higher rate of speed. This provides the advantage that a technician (or other individual) may more quickly perform an actuator calibration or actuator commissioning.

According to one exemplary embodiment, actuator 100 remains in the second (fast) speed mode until mode selection switch 120 is moved to a different mode. According to another exemplary embodiment, however, actuator 100 automatically goes back to the first (slow) speed mode once the calibration of actuator 100 is completed.

According to another exemplary embodiment, moving or placing mode selection switch 120 through a predetermined or predefined sequence of modes sends an input signal to processing circuit 130 to operate motor 140 in the second speed mode. For example, moving mode selection switch 120 to a rightmost position and back to a leftmost position sends an input signal to processing circuit 130 to operate motor 140 in the second speed mode. According to another exemplary embodiment, moving mode selection switch 120 to a leftmost position and back to a rightmost position sends an input signal to processing circuit 130 to operate motor 140 in the second speed mode. According to other exemplary embodiments, the predefined sequence includes holding mode selection switch 120 in a first position for a predefined amount of time (such as, e.g., 1 second, 5 seconds, etc.) before moving to a second position (and possibly a third position, fourth position, etc.). According to another exemplary embodiment, the predefined sequence includes moving mode selection switch 120 full left (or right), then full right (or left) and then to the calibration position (with or without holding each individual position for a predefined amount of time). According to various exemplary embodiments, any number of predetermined sequences may be programmed to send an input signal to processing circuit 130 to operate motor 140 in the second speed mode.

According to another exemplary embodiment, an input signal may be sent to processing circuit 130 to operate motor 140 in the second speed mode without physically adjusting actuator 100. For example, an override input signal may be sent to processing circuit 130 to operate motor 140 in the second speed mode. Such an override signal my come from (i.e., be sent by) a controller that is in communication with actuator 100. For example, a field controller (such as, e.g., economizer controller 222) may send an override signal to processing circuit 130. Alternatively, a building management system controller (such as, e.g., BMS controller 226) may send an override signal to processing circuit 130.

According to one exemplary embodiment, an override signal may be sent based on a command input of an operator or technician. For example, a manual override switch may be activated (i.e., switched to an on position) to send the override signal to processing circuit 130. According to another exemplary embodiment, an override signal may be sent based on a specific condition occurring within the HVAC system (e.g., a fire) without a direct command input of an operator or technician. In other words, an override signal may be sent automatically during certain conditions without the physical input or command of an operator or technician.

According to an exemplary embodiment, an override signal may be sent to processing circuit 130 via input connection 104. For example, the override signal may be an alternating current voltage (VAC) signal that is wired to processing circuit 130 via input connection 104. According to one exemplary embodiment, the VAC signal is provided at 24 VAC. However, according to other exemplary embodiments, the VAC signal may have a greater or smaller value. According to still other exemplary embodiments, the override signal may be a signal other than a VAC signal.

According to an exemplary embodiment, an override signal may cause actuator 100 to move to a predetermined rotational position (e.g., fully closed, half open, fully open, etc.). Because actuator 100 is in the second (high) speed mode, actuator 100 reaches the predetermined position much faster than if actuator 100 was in the first (slow) speed mode. This allows the damper (or other driven component of the HVAC system) to move much more quickly to its predetermined position, such as in the case of an emergency (e.g., a fire, an air purge, etc.).

Figure 8:
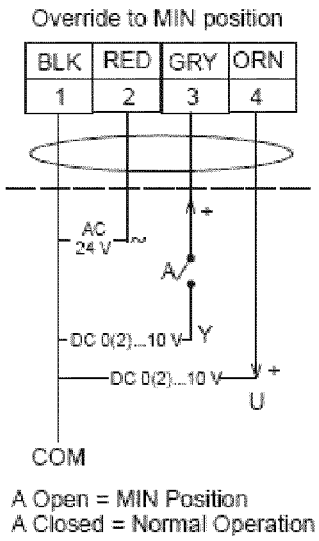
FIGS. 8-11 are detailed override wiring diagrams for the actuator of FIG. 3, according to various exemplary embodiments.
Figure 9:
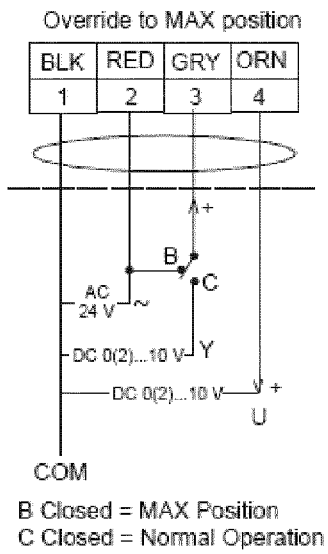
Figure 10:
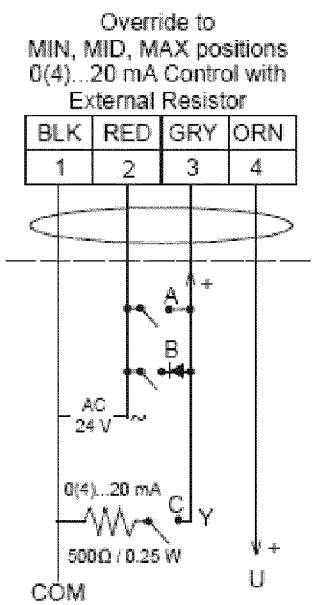
Figure 11:
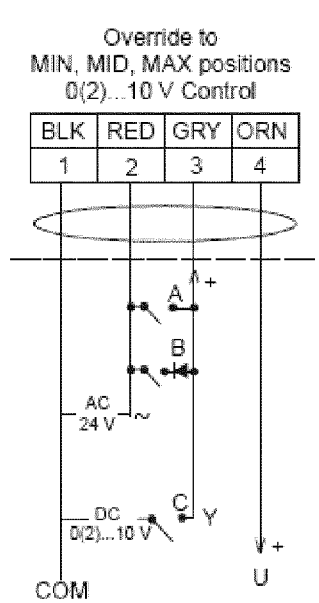

Referring now to FIGS. 8-11, various configurations of wiring an override signal (e.g., a 24 VAC signal) to actuator 100 are shown according to various exemplary embodiments. For example, FIG. 8 shows a wiring configuration of an override signal to cause a minimum rotational position of actuator 100. FIG. 9 shows a wiring configuration of an override signal to cause a maximum rotational position of actuator 100. FIG. 10 shows a wiring configuration of an override signal to cause a minimum, middle, or maximum rotational position of actuator 100 based on a 0 or 4 to 20 mA control using an external resistor. FIG. 11 shows a wiring configuration of an override signal to cause a minimum, middle, or maximum rotational position of actuator 100 based on a 0 or 2 to 10 VDC control.

It should be noted that other wiring configurations are possible, as one of ordinary skill in the art would readily recognize, and that the wiring configurations shown in FIGS. 8-11 are illustrative of only a few examples that are possible.

Figure 12:
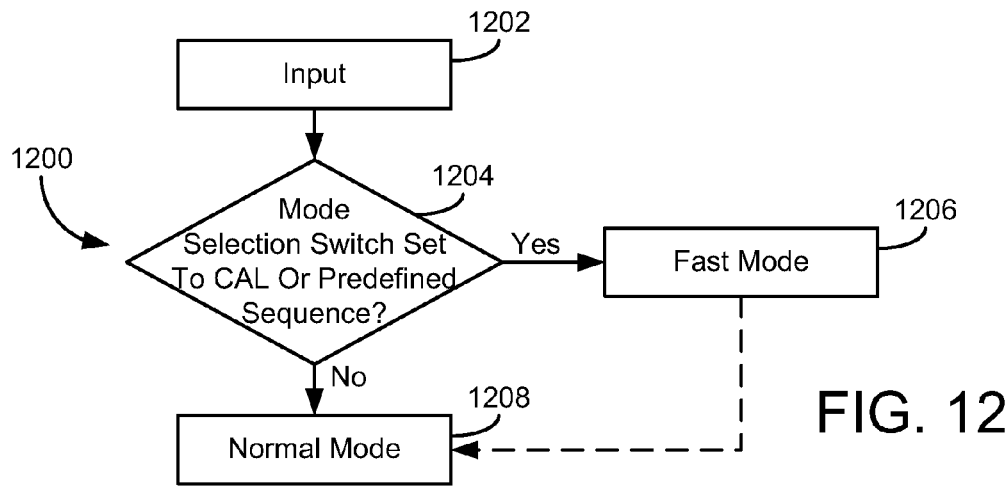
FIG. 12 is a flowchart of a method of adjusting the speed of the actuator of FIG. 3, according to an exemplary embodiment.

Referring now to FIG. 12, a flowchart of a process 1200 for adjusting the speed of an actuator (such as, e.g., actuator 100) is shown according to an exemplary embodiment. Process 1200 includes a first step 1202 of having a processing circuit (such as, e.g., processing circuit 130) receive an input signal. A second step 1204 includes determining if the mode selection switch is set to a calibration mode or setting (e.g., CAL on mode selection switch 120), or if the mode selection switch has been moved or run through a predefined sequence (e.g., full left-full right, full right-full left, etc.). In other words, the processing circuit analyzes the type of input signal coming from the mode selection switch. If the mode selection switch is set to a calibration setting or has been moved through a predefined sequence, the processing circuit of the actuator changes the speed of the actuator from a first speed mode to a second speed mode or a fast mode 1206. If the mode selection switch is not set to a calibration setting or has not been moved through a predefined sequence, the processing circuit of the actuator keeps the speed of the actuator in a first speed mode or a normal mode 1208.

According to one exemplary embodiment, the processing circuit automatically changes the speed of the actuator from the fast mode 1206 back to the normal mode 1208. This can be done, for example, after a predetermined sequence of events. For example, the speed of the actuator may be changed back to normal mode after completion of the calibration sequence (which would occur at the fast speed or fast mode). Alternatively, the speed of the actuator may be changed back to normal mode after a preset amount of time. According to another exemplary embodiment, the actuator may remain in the fast mode 1206 until the mode selection switch is moved from the calibration mode.

Figure 13:
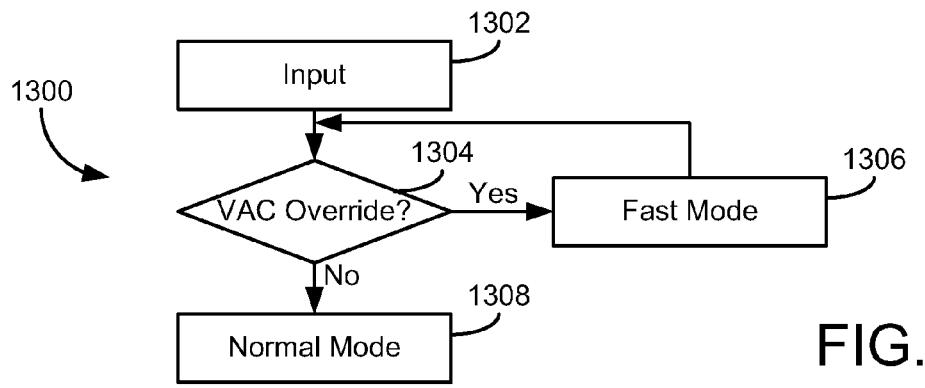
FIG. 13 is a flowchart of another method of adjusting the speed of the actuator of FIG. 3, according to an exemplary embodiment.

Referring now to FIG. 13, a flowchart of a process 1300 for adjusting the speed of an actuator (such as, e.g., actuator 100) is shown according to another exemplary embodiment. Process 1300 includes a first step 1302 of having a processing circuit (such as, e.g., processing circuit 130) receive an input signal. A second step 1304 includes determining if the input signal is an override signal (e.g., an VAC override signal). If the input signal is an override signal, the processing circuit of the actuator changes the speed of the actuator from a first speed mode to a second speed mode or a fast mode 1306. If the input signal is not an override signal, the processing circuit of the actuator maintains the speed of the actuator in a first speed mode or a normal mode 1308.

According to the exemplary embodiment shown in FIG. 13, the processing circuit maintains the actuator in fast mode 1306 until the override signal is no longer present (e.g., the override signal is shut off). However, according to other exemplary embodiments, the processing circuit may change the speed of the actuator back to normal mode 1308 after a predetermined series of events or conditions, or after a predetermined amount of time.

Figure 14:
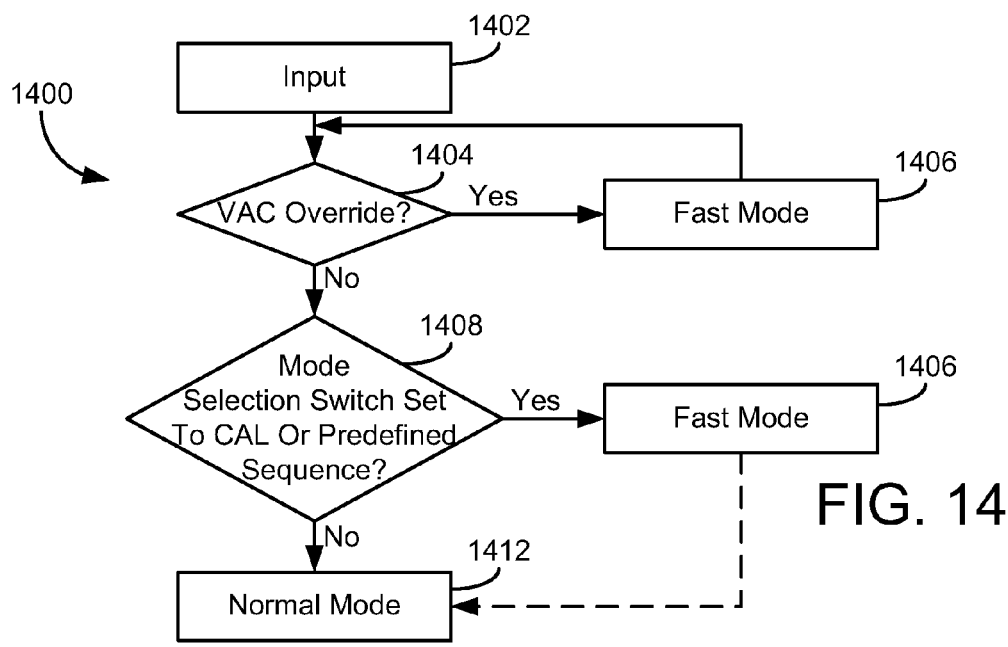
FIG. 14 is a flowchart of yet another method of adjusting the speed of the actuator of FIG. 3, according to an exemplary embodiment.

Referring now to FIG. 14, a flowchart of a process 1400 for adjusting the speed of an actuator (such as, e.g., actuator 100) is shown according to another exemplary embodiment. Process 1400 includes a first step 1402 of having a processing circuit (such as, e.g., processing circuit 130) receive an input signal. A second step 1404 includes determining if the input signal is an override signal (e.g., an VAC override signal). If the input signal is an override signal, the processing circuit of the actuator changes the speed of the actuator from a first speed mode to a second speed mode or a fast mode 1406. If the input signal is not an override signal, the processing circuit of the actuator determines if the mode selection switch is set to a calibration mode or setting (e.g., CAL on mode selection switch 120) or if the mode selection switch has been moved through a predefined sequence (e.g., full left-full right, full right-full left) during step 1408 of process 1400. If the mode selection switch is set to a calibration setting or moved through a predefined sequence, the processing circuit of the actuator changes the speed of the actuator from a first speed mode to a second speed mode or a fast mode 1406. If the mode selection switch is not set to a calibration setting or moved through a predefined sequence, the processing circuit of the actuator maintains the speed of the actuator in a first speed mode or a normal mode 1412.

According to the exemplary embodiment shown in FIG. 14, the processing circuit keeps the actuator in fast mode 1406 until the override signal is no longer present (e.g., the override signal is shut off). However, according to other exemplary embodiments, the processing circuit may change the speed of the actuator back to normal mode 1412 after a predetermined series of events or conditions, or after a predetermined amount of time.

Also according to the exemplary embodiment shown in FIG. 14, after detecting a calibration setting of the mode selection switch, the processing circuit automatically changes the speed of the actuator from the fast mode 1406 back to the normal mode 1412. This can be done, for example, after a predetermined sequence of events (e.g., after calibration is complete), or after a preset amount of time. Alternatively, according to another exemplary embodiment, the actuator may remain in the fast mode 1406 until the mode selection switch is moved from the calibration mode.

Figure 15:
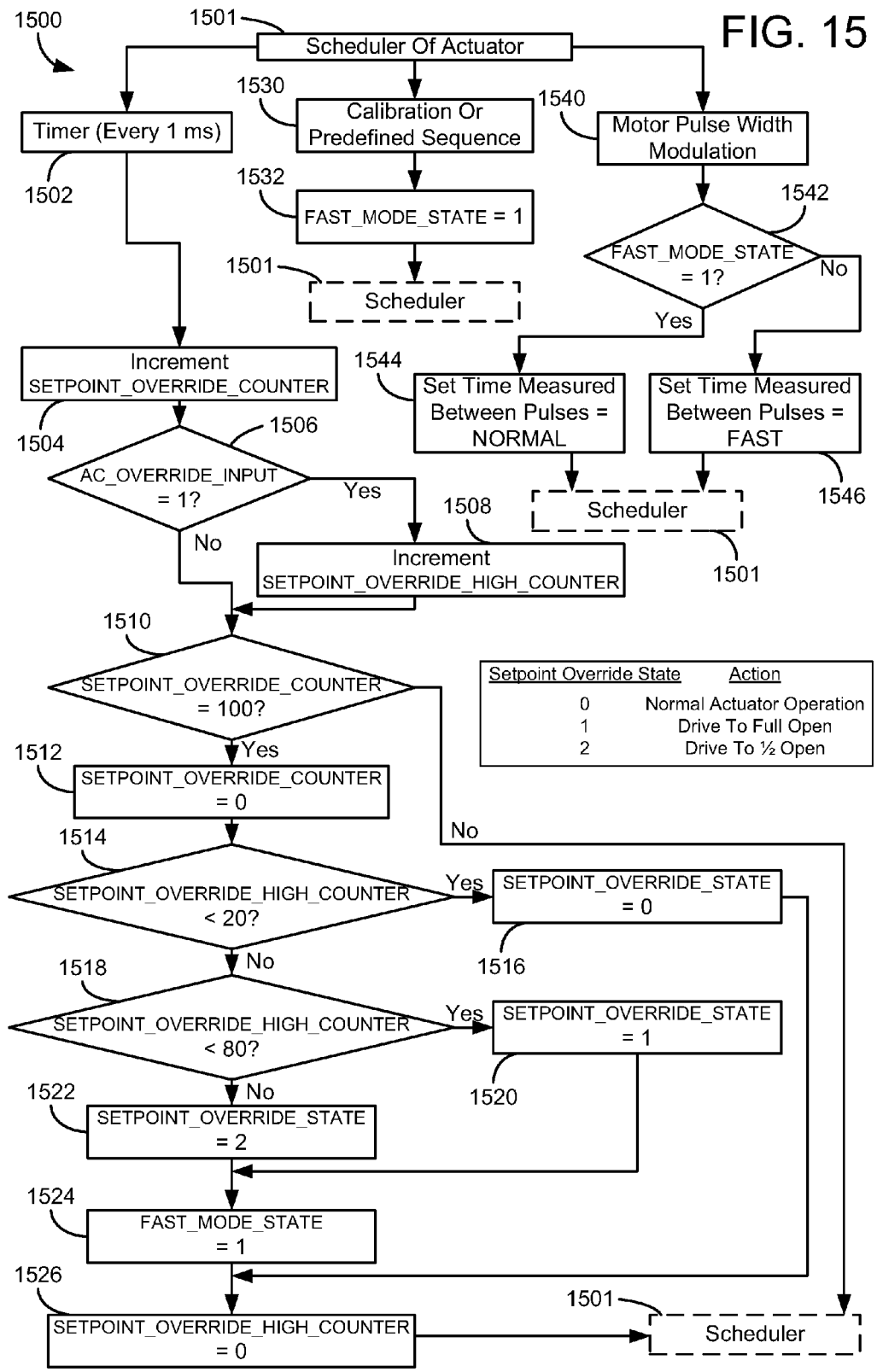
FIG. 15 is a flowchart of yet another method of adjusting the speed of the actuator of FIG. 3, according to an exemplary embodiment.

Referring now to FIG. 15, a flowchart of a process 1500 for adjusting the speed of an actuator (such as, e.g., actuator 100) is shown according to another exemplary embodiment. Process 1500 includes a step 1501 shown as a scheduling routine or algorithm of the actuator. The scheduling routine includes several subroutines or algorithms, shown as a timing step 1502, an autocalibration step 1530, and a motor pulse width modulation step 1540. Each of these steps or subroutines may occur at the same time. However, according to another exemplary embodiment, all or a portion of these steps or subroutines may occur sequentially.

According to the exemplary embodiment shown in FIG. 15, the timer step 1502 includes a step 1504 to increment (e.g., advance) the Setpoint Override Counter (e.g., every 1 millisecond). Next, step 1506 looks to see if the AC Override Input is equal to 1. If it is, step 1508 increments (e.g., advances) the Setpoint Override High Counter. If the AC Override Input is not equal to 1, or after step 1508 increments the Setpoint Override High Counter, step 1510 then determines if the Setpoint Override Counter is equal to 100. In other words, step 1510 looks to see if 100 milliseconds has gone past. If 100 milliseconds has not passed, the next step is to return to the scheduler step 1501. In this case, the timer step 1502 can be performed again, with the Setpoint Override Counter being incremented again until it reaches 100 milliseconds. Of course, as one of ordinary skill in the art would readily recognize, different values of time may be utilized in the timer subroutine (i.e., values different than 1 and 100 milliseconds may be chosen).

Once the Setpoint Override Counter is equal to 100 milliseconds (i.e., once step 1510 is yes or true), step 1512 then resets the Setpoint Override Counter to 0. Step 1514 then determines if the Setpoint Override High Counter is less than 20. Here, the value of 20 is chosen to account for any noise within the system. In actuality, step 1514 is determining if the nominal value of the Setpoint Override High Counter is close to zero. If the Setpoint Override High Counter is less than 20 (i.e., close to zero), a Setpoint Override State is set to 0 in step 1516. However, if the Setpoint Override High Counter is greater than 20, step 1518 determines if the Setpoint Override High Counter is less than 80. Here, the value of 80 is again chosen to account for any noise in the system, with the nominal value being analyzed being either 50 or 100. Of course, as one of ordinary skill in the art would readily recognize, different values of comparison for the Setpoint Override High Counter may be utilized in this subroutine (i.e., values different than 20 and 80 may be chosen).

If the Setpoint Override High Counter is less than 80 (i.e., close to 50), a Setpoint Override State is set to 1 in step 1520. However, if the Setpoint Override High Counter is greater than 80 (i.e., close to 100), step 1522 sets the Setpoint Override State to 2. Step 1524 then sets a Fast Mode State equal to 1 after both steps 1520 and 1522. Step 1526 then resets the Setpoint Override High Counter to 0, and then returns to the scheduler step 1501.

In general terms, the timer subroutine (steps 1502 through 1526) is looking to see if an override signal (e.g., an VAC override signal) is being sent to the processing circuit. If there is no override signal present, the actuator remains in normal operation mode (as represented by the Setpoint Override State being equal to 0). If there is an override signal present, the actuator is changed to a fast mode state (step 1524 sets the Fast Mode State equal to 1). As shown in the exemplary embodiment of FIG. 15, a full wave AC override signal drives the actuator to ½ open (step 1522 sets the Setpoint Override State to 2), while a half rectified wave AC override signal drives the actuator to full open (step 1520 sets the Setpoint Override State to 1).

The internal routine logic may be configured differently in other embodiments. For example, a full wave AC override signal may be chosen to drive the actuator to full open, while a half rectified wave AC override signal may be chosen to drive the actuator to ½ open.

Referring now to step 1530, the processing circuit is detecting if the actuator is in a calibration mode or if the mode selection switch has been moved through a predefined sequence. This may occur by a mode selection switch (such as, e.g., mode selection switch 120) being in a calibration mode (such as, e.g., CAL on mode selection switch 120), or by moving the mode selection switch full left (or right) and then full right (or left). If the actuator is in a calibration mode (i.e., if the switch is set to CAL) or has been moved through the predefined sequence, step 1532 sets the Fast Mode State equal to 1. At this point, the process returns to scheduler step 1501, with the calibration function being performed at the fast speed mode.

Referring now to motor pulse width modulation step 1540, the processing circuit is analyzing the interrupt times between half pulses of the motor of the actuator. This is done in order to control the speed of the motor during the fast mode and the normal (slow) mode. In essence, the interrupts between motor pulses are shorter in the fast mode, and have to be accounted for when controlling the speed of the motor. Step 1542 determines if the Fast Mode State is equal to 1. If the Fast Mode State is equal to 1, step 1546 sets the time measured between pulses to Fast. If the Fast Mode State is not equal to 1, step 1544 sets the time measured between pulses to Normal.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An actuator in an HVAC system, comprising:
   a housing;
   a motor;
   a hub configured to receive a shaft;
   an input connection configured to receive a first input signal for controlling operation of the actuator;
   a user-operable mode selection switch attached to the housing and movable between a plurality of switch positions, each of the switch positions corresponding to a distinct operating mode, wherein the plurality of switch positions include a calibration position corresponding to a calibration mode; and
   a processing circuit configured to control operation of the actuator using the first input signal, wherein moving the user-operable mode selection switch into the calibration position sends a second input signal to the processing circuit, wherein the processing circuit is further configured to temporarily shift the actuator from a first speed mode to a second speed mode that is faster than the first speed mode upon receiving the second input signal and to perform a calibration process with the actuator in the second speed mode, the calibration process comprising operating the actuator to drive the shaft through a predetermined sequence of positions with the actuator in the second speed mode, wherein performing the calibration process with the actuator in the second speed mode accomplishes the calibration process more quickly than if the calibration process were performed with the actuator in the first speed mode.

2. The actuator of claim 1, wherein the user-operable mode selection switch is a potentiometer.

3. The actuator of claim 1, wherein the processing circuit is configured to determine a position of the user-operable mode selection switch,
wherein the processing circuit is configured to temporarily shift the actuator from the first speed mode to the second speed mode in response to a determination that the user-operable mode selection switch has been moved through a predefined sequence of switch positions.

4. The actuator of claim 3, wherein the predefined sequence of switch positions comprises moving the user-operable mode selection switch to a rightmost position and back to a leftmost position.

5. The actuator of claim 3, wherein the predefined sequence of switch positions comprises moving the user-operable mode selection switch to a leftmost position and back to a rightmost position.

6. The actuator of claim 1, wherein the processing circuit is configured to monitor the first input signal for an external override signal,
wherein the processing circuit is configured to temporarily shift the actuator from the first speed mode to the second speed mode in response to detecting the external override signal.

7. The actuator of claim 6, wherein the override signal is a 24 VAC signal.

8. The actuator of claim 6, wherein the override signal is from a controller.

9. The actuator of claim 8, wherein the controller is a field controller.

10. The actuator of claim 8, wherein the controller is a building management system controller.

11. The actuator of claim 1, wherein the first input signal is sent without any physical adjustment of the actuator.

12. The actuator of claim 1, wherein the processing circuit is configured to automatically perform the calibration process upon shifting the actuator from the first speed mode to the second speed mode.

13. The actuator of claim 1, wherein the processing circuit is configured to automatically shift the actuator from the second speed mode back to the first speed mode upon completing the calibration process.

14. The actuator of claim 1, wherein operating the actuator to drive the shaft through the predetermined sequence of positions comprises sequentially driving the shaft from an initial shaft position to at least one of a minimum shaft position and a maximum shaft position.

15. A method for temporarily changing the speed of an actuator for an HVAC system, the method comprising:
providing a processing circuit;
receiving, at the processing circuit, a first input signal for controlling operation of the actuator;
moving a user-operable mode selection switch of the actuator into a calibration position, wherein the user-operable mode selection switch is attached to the housing of the actuator and movable between a plurality of switch positions, each of the switch positions corresponding to a distinct operating mode, the calibration position corresponding to a calibration mode;
detecting, with the processing circuit, a second input signal, wherein the second input signal is sent to the processing circuit in response to moving the user-operable mode selection switch into the calibration position;
changing the speed of the actuator from a first speed mode to a second speed mode in response to detecting the second input signal, the second speed mode having a different speed than the first speed mode; and
performing a calibration process with the actuator in the second speed mode, the calibration process comprising moving the actuator through a predetermined sequence of positions with the actuator in the second speed mode.

16. The method of claim 15, further comprising automatically changing the speed of the actuator back to the first speed mode after a predetermined sequence of events.

17. The method of claim 16, wherein the predetermined sequence of events comprises performing the calibration process.

18. The method of claim 16, wherein the predetermined sequence of events comprises removing the first or second input signal.

19. The method of claim 15, wherein the second input signal is from the user-operable mode selection switch of the actuator.

20. The method of claim 15, wherein the first input signal is an override signal from a controller.

* * * * *